US005194211A

United States Patent [19]

Adams et al.

[11] Patent Number: 5,194,211

[45] Date of Patent: Mar. 16, 1993

[54] BAR STAMPING

[75] Inventors: Michael J. Adams; Brian Edmondson, both of South Wirral, England

[73] Assignee: Lever Brothers Company, Division of Conopco, Inc., New York, N.Y.

[21] Appl. No.: 773,470

[22] Filed: Oct. 9, 1991

[30] Foreign Application Priority Data

Oct. 10, 1990 [GB] United Kingdom ................. 9022027

[51] Int. Cl.$^5$ ................................................ B29C 43/02

[52] U.S. Cl. ........................................ 264/320; 425/395

[58] Field of Search ................. 264/293, 320; 425/395

[56] References Cited

U.S. PATENT DOCUMENTS 3,449,804 6/1969 Moses et al. ........................ 264/320

4,473,522 9/1984 Marchesani ......................... 264/320

4,793,959 12/1988 Adams et al. ................... 425/395 X

FOREIGN PATENT DOCUMENTS 88-07572 10/1988 PCT Int'l Appl. .

88-07573 10/1988 PCT Int'l Appl. .

*Primary Examiner*—Jan H. Silbaugh

*Attorney, Agent, or Firm*—Ronald A. Koatz

[57] ABSTRACT

Bars of soap, synthetic detergent or mixtures of them are stamped between dies. In contrast with conventional stamping machinery the relative velocity of the dies is made to decrease at a rate which is more than proportional to the decrease in distance between the dies. Preferably the decrease is at a rate which is proportional to the cube of the decrease in distance. The process leads to a reduction in the adherence of soap/detergent to the dies.

8 Claims, No Drawings

BAR STAMPING

FIELD OF THE INVENTION

The present invention relates to the stamping of soap and/or detergent bars. By "soap and/or detergent" bars we mean any bar, cake, tablet or the like made from conventional soap (ie. alkali metal salts of long chain fatty acids) or a non-soap detergent or a mixture of conventional soap and a non-soap detergent (in which soap may predominate). For convenience the bars will generally be referred to below as "soap bars".

BACKGROUND OF THE INVENTION AND SUMMARY OF THE PRIOR ART

Traditionally soap bars are stamped from extruded billets of material in order to achieve bars of an attractive and uniform appearance. A common problem in bar stamping is however that of die blocking. Die blocking occurs when small particles of soap transfer from the billet surface and adhere to the die surface.

The initial small particle of soap can act as a nucleus for the adhesion of more soap material from subsequently stamped billets until the adhering collection of soap material is sufficiently large to impart visually perceptible indentations in further stamped soap bars.

Conventionally a pair of die members employed in stamping of soap bars follows a stamping cycle controlled by a simple cam mechanism. In order to aid the mechanical workings and longevity of the stamping machine the cycle will be fixed. The velocities of approach and release from the bar will normally follow a simple sinusoidal cycle.

In such a case the relative velocity V of the dies after initial contact with the billet is approximately related to the distance h between the dies by an equation of the form $$V=kh^{0.5}$$

where k is a constant.

The equation is approximate, because the velocity V must of course reduce to zero as the dies reach their position of closest approach. At this position the dies do not normally touch. There remains a small gap between them through which surplus soap is extruded as a flashing.

Because of this relationship between V and h, V decreases less rapidly than h. For instance as h drops from an arbitary value $h_a$ to $\frac{1}{2}h_a$, the magnitude of V drops from $$V_a \text{ to } K(\tfrac{1}{2}h_a)^{0.5}=(\tfrac{1}{2})^{0.5}V_a=0.71\ V_a$$

This can be expressed as a statement that V decreases less than linearly with distance.

Typically the relative velocity V of the dies at the point of the cycle where they come into contact with the soap billet is 300 mm/sec.

W088/7572 and W088/7573 discloses soap stamping machinery in which dies are moved by a programmable actuator. These documents envisage that the dies will be caused to move according to predetermined rules concerning position and speed of movement. However, the nature of such rules is not stated.

The conventional sinusoidal cycle may be optimum from the point of view of operation and wear and tear of the stamping machine but we have found that it is not optimum having regard to reducing die blocking on the resulting soap bars. Die blocking occurs due to the adhesive forces existing between the soap bar surface and the die member surfaces as the dies separate after stamping.

We have found that a significant factor affecting the magnitude of these adhesive forces and hence the extent of die blocking is the magnitude of the maximum compressive force between the closing dies and the soap. We have found that a reduction in die blocking can be achieved by imposing a different relationship between the relative velocity of the dies and the distance between them, so as to reduce the maximum compressive force.

If stamping is carried out with apparatus where the velocity is related to distance by a formula such as $$V=kh^{0.5}$$

as in conventional cam driven machinery, we have found that the compressive force between the soap and the dies rises progressively as the dies close together, and becomes very high at the end of their stroke. This of course signifies that the maximum compressive force could be reduced simply by slowing the machinery. However, that would reduce overall production.

However, if the relationship between velocity and distance is changed so that the dies' relative velocity is made to drop more sharply during at least part of their travel after contacting the billet, their velocity during the latter part of their travel becomes a smaller fraction of their velocity when they contact the billet. As a result the maximum compressive force is reduced without bringing about as great a reduction in the overall rate of stamping. According to a first aspect, the present invention provides a process for stamping soap and/or detergent bars in which a billet is located between a pair of opposing die members which are urged together to stamp the billet into a bar, characterised in that for at least part of the travel of the dies from initial contact with the billet to their point of closest approach, their relative velocity (V) decreases at a rate which is more than proportional to the change in the distance (h) between the dies.

With this relationship between velocity and distance, the velocity $V_a$ at a distance $h_a$ and the velocity $V_b$ at a later distance $h_b$ will be related by the inequality $$\frac{V_b}{V_a} < \frac{h_b}{h_a}.$$

Preferably the relationship between velocity and distance may approximate to $$V=k'h^n$$

where k' is a constant and n is at least 1.5 better 2 or more. In particular it is preferred to approximate such a formula in which n=3. Then the compressive force will remain roughly constant as distance h decreases.

Such a relationship has the consequence that velocity and distance satisfy an inequality:

$$\frac{V_b}{V_a} \leqq \left(\frac{h_b}{h_a}\right)^m$$

where $m \geqq 1.5$, e.g. $m \geqq 2$.

By arranging relative velocity to follow such a relationship to distance it is possible to achieve a reduction in the maximum compressive force while increasing the relative velocity of the dies at the moment of initial contact with the billet, and so not increasing the overall stamping cycle time.

The invention thus leads to a reduction in the occurrence of die blocks, yet the overall rate of production does not need to be diminished unacceptably, and indeed may not be diminished at all.

DETAILED DESCRIPTION OF EMBODIMENTS

The relative velocity of the dies when they contact the soap is preferably higher than is the case with conventional soap stamping machinery. It is preferred that the relative velocity at contact is in a range from $5 \times 10^3$ to $1 \times 10^6$ mm/min. Preferably it is in the range $1 \times 10^4$ to $1 \times 10^5$ mm/min.

A relationship between velocity and distance in accordance with this invention may be used for substantially the whole travel of the dies from initial contact with the soap billet up to the closest approach of the dies.

However, a benefit can be obtained if the relationship is used for only a part of this travel. For instance the relationship could be followed for the last part of the travel, when conventional machinery reaches maximum compressive force.

Velocity during an earlier part of the travel might simply be a maximum attainable with the machinery used.

Alternatively a velocity relationship in accordance with this invention might be used for an initial part of the travel after contact with the billet, leading to a speed of contact higher than conventional (benefit: faster operating speed without concomitant worsening of blocking) and/or a reduction in speed during the subsequent travel even if that followed a conventional relationship of the $$V = kh^{0.5}$$

form (benefit: reduced maximum compressive force and reduced die blocking).

A velocity relationship in accordance with the invention could, for reasons already mentioned, be beneficial if used for an intermediate portion of the travel, later than initial contact with the billet and not continuing all the way to full die closure.

Preferably a relationship in accordance with the invention is complied with for substantially the whole closing travel after reaching a distance h which is less than the distance at initial contact with the billet, preferably less than 80% thereof, A further preferred feature is that separation of the dies from the soap bars after stamping takes place with a low velocity. This too has been found to give a reduction in the adhesive force applied to the soap surface.

The speed of separation of the dies relative to each other at the stage when the dies separate from the soap preferably lies within a range 0.1 to 1000 mm/min.

Once the dies have separated from the soap their relative speed should desirably be increased to increase the overall rate of production.

To decrease the stamping cycle time even more, the opening motion of the dies may commence with a very short rapid motion. Provided this is sufficiently short, the compressed soap will undergo elastic recovery and the dies will not separate from the soap until the subsequent further separation at slow speed.

Stamping in accordance with this invention could be carried out using conventional machinery modified by changing the profile of the driving cam. Preferably, however, the relative motion of the dies is brought about by means of a programmable hydraulic actuator. Programmable hydraulic actuators are known for use in other fields of production engineering. It will probably be desirable to employ equipment having a high degree of resolution, if it is to implement the preferred features of short but rapid initial opening motion and/or slow movement to separate from the soap.

The actual velocities selected for any one application will vary from case to case and optimum values may depend inter alia on the type and temperature of soap composition being stamped and the geometry of the die members.

The digital nature of a programmed displacement control results in a stepped motion whose amplitude can be, and needs to be, controlled depending on the soap type.

Use of the present process has been found to reduce die blocking and hence provide soap bars having consistently improved appearance. If desired it can be used in conjunction with the subject matter of our co-pending patent application PCT/GB 90/00972 now published as WO 91/00338 relating to chilled die members in which turbulent flow of coolant through tubes or chambers within the body of the die member is employed in order to ensure a predetermined temperature at the die surface in contact with the soap bar surface. Alternatively the present process can be employed in conjunction with the subject matter of our published copending application EP-A-276921 which describes the use of elastomerically coated dies having a modulus of elasticity less than that of the soap being stamped.

EXAMPLES

The present invention will now be described further by way of example only with reference to the following examples.

EXPERIMENTAL APPARATUS AND MATERIAL

A small soap-stamping machine was utilised. This machine had one moving die and one stationary die. The machine was modified by fitting a load cell between the stationary die and the machine structure, and by replacing the drive of the moving die with a programmable hydraulic actuator. This was controlled by a small computer. The load cell was connected to a data logger.

During the closing of the dies the load cell measured the compressive force applied to the soap. During the opening of the dies, the load cell measured the adhesive force between the dies and the soap.

The stamping machine was used to stamp toilet soap billets taken from commercial production and wrapped in water-impermeable film until stamping, so as to prevent moisture loss.

EXAMPLE 1

Using this equipment, soap bars were stamped using a variety of relationships between the velocity and distance during closing of the dies, while separation of the dies took place at a constant separation velocity of 14 mm/sec.

The distance between the dies at initial contact was 38 mm. For a first part of the travel after contact the velocity was maintained constant at 195 mm/sec. After reaching a distance $h_0$ between the dies the velocity decreased from 195 mm/sec ($V_0$) with a relationship $$V = kh^n$$

k was given by $$k = \frac{V_0}{h_0^n} = \frac{195\ \text{mm/sec}}{h_0^n}$$

This was done with several values of $h_0$ and n. Maximum adhesive force during separation was recorded. Results are given in the following table.

| $h_0$ | n | Adhesive Force (N) |
|---|---|---|
| 15.7 | 1 | 252 |
| 8.9 | 1 | 316 |
| 0.9 | 1 | 446 |
| 15.7 | 2 | 99 |
| 8.9 | 2 | 202 |
| 0.9 | 2 | 296 |
| 7.6 | 3 | 119 |

The increase in adhesive force with reduction in $h_0$ demonstrates that adhesive force during die separation rises if velocity in the later parts of the closing travel are higher.

The reduction in adhesive force as n is increased from 1 to 3 is apparent.

EXAMPLE 2

Soap bars were stamped as in Example 1, so that $V = kh^n$ after h has decreased to $h_0$, using various different values for the constant separation velocity of the dies as they open. A higher initial velocity $V_0$ was also used. This was the constant closing velocity of the dies until the distance reduced to $h_0$.

Some stamping was carried out using a relationship of the conventional form $$V = kh^{0.5}$$

for the whole period of contact with the soap, both during closing and opening of the dies.

Results are set out in the accompanying table. For convenience this includes results from Example 1 above. Included in this table is maximum compressive force during closing of the dies. Also included is contact time which is the total time for which dies are in contact with the soap.

| n | Contact Time (sec) | $V_0$ (mm/s) | $h_0$ (mm) | Sepn. Vel. (mm/sec) | Compressive Force (kN) | Adhesive Force (N) |
|---|---|---|---|---|---|---|
| 0.5 | 0.43 | ~200 | — | ~40* | 16.2 | 353 |
| | 0.803 | ~100 | — | ~20* | 12.7 | 405 |
| | 3.7 | ~20 | — | ~4.8* | 7.9 | 253 |
| 1 | 1.716 | 195 | 15.7 | 1.4 | 14.3 | 220 |
| | 1.606 | 195 | 8.9 | 1.4 | 15.4 | 290 |
| | 1.564 | 195 | 0.9 | 1.4 | 21.1 | 378 |
| | 0.655 | 195 | 15.7 | 14 | 13.3 | 252 |
| | 0.56 | 195 | 8.9 | 14 | 15.2 | 316 |
| | 0.577 | 195 | 0.9 | 14 | 21.7 | 446 |
| 2 | 1.887 | 195 | 15.7 | 14 | 6.6 | 99 |
| | 0.862 | 195 | 8.9 | 14 | 8.3 | 202 |
| | 0.571 | 95 | 0.9 | 14 | 18.9 | 296 |
| 3 | 1.78 | 195 | 7.6 | 14 | 6.8 | 119 |
| | 0.535 | 280 | 7.4 | ~28* | 6.5 | 192 |
| | 0.905 | 280 | ~9 | 176 | 6.7 | 200 |
| | 0.665 | 280 | 7.4 | 144 | 7.0 | 216 |
| | 0.988 | 280 | 7.4 | 2.3 | 7.0 | 103 |
| | 0.84 | 280 | 7.4 | 5 | 7.1 | 136 |
| | 0.75 | 280 | 7.4 | 10 | 7.0 | 102 |
| | 0.71 | 280 | 7.4 | 20 | 7.1 | 144 |
| | 0.678 | 280 | 7.4 | 50 | 6.8 | 195 |
| | 0.672 | 280 | 7.4 | 118 | 6.6 | 271 |
| | 0.897 | 280 | 7.4 | 2.3# | 6.6 | 109 |

*Approximate value at the instant of separation from the soap determined from plot of position against time.

#Opening at constant 2.3 mm/sec preceded by rapid opening through 0.37 mm.

Comparison of the adhesive forces measured with the two separation velocities employed while n=1 shows that the slower speed gives a benefit, but not nearly so great as using a higher value for n.

EXAMPLE 3

Soap bars were stamped using a single speed of approach of 150 mm/sec but several different speeds of separation.

The results showed some statistical spread but separation speeds of 1 mm per second or more led to adhesive forces exceeding 400N, whereas separation speeds of less than 1 mm per second led to adhesive force of 270 to 370N. However, it was not possible to achieve lower adhesive forces, indicating that a slow separation speed can reduce the adhesive force on the soap, but there is a limit to the reduction which can be achieved by this expedient alone.

EXAMPLE 4 (COMPARATIVE)

Soap bars were stamped, with the relative die velocity during closure varying in accordance with the $$V = kh^{0.5}$$

relationship characteristic of conventional machinery. The opening velocity of the dies increased according to the same relationship. The compressive and adhesive forces were monitored continuously. It was observed that the compressive force rose progressively to a peak value of 11.8 kN as the dies came together. The adhesive force peaked very sharply as the dies began to open, reaching a maximum of 309N.

EXAMPLE 5

Soap bars were moulded using a die closure velocity which remained constant at 280 mm/sec ($1.68 \times 10^4$ mm/min) from initial contact with the billet until distance decreased to $h_0 - 7.4$ mm. Thereafter velocity decreased in accordance with a relationship $$V = kh^3$$

$$k = \frac{V_0}{h_0^3} = \frac{280\ \text{mm/sec}}{(7.4\ \text{mm})^3}$$

Forces were monitored continuously. The compressive force rose to about 6 kN well before the die closed, and thereafter varied only slightly during the remaining closing movement. The maximum compressive force was 6.4 kN which is of course lower than the value of 11.8 kN in the previous example.

On opening the dies were separated rapidly by a small amount, approximately 0.37 mm, which had previously been determined to be less than the elastic recovery of the soap. Further opening movement continued at a slow speed of 2.3 mm/sec (=138 mm/min) increasing very rapidly after the dies separated from the soap.

The adhesive force between the dies and the soap rose to a maximum of 155N during this slow separation, i.e. after the initial rapid motion in which elastic recovery occurred but before the rapid acceleration of the opening dies.

This example used the same conditions as for the final line of the table in Example 2, but the soap came from a different batch, leading to slight variation in the results obtained.

EXAMPLE 6

This example investigates the effect of die temperature. In the preceding examples the dies were kept at room temperature of about 20° C. In this example the procedures of Examples 4 and 5 were repeated, while the temperature of the dies was controlled by water from a supply at regulated temperature. The maximum adhesive force was observed at various die temperatures.

Results were as follows:

| Die temperature | Maximum adhesive force (N): Conventional procedure as Example 4 | Maximum adhesive force (N): Procedure as Example 5 |
|---|---|---|
| 5° C. | 135 | 50 |
| 9° C. | 171 | 79 |
| 13° C. | 175 | 76 |
| 17° C. | 182 | 126 |
| 20° C. | 220 | 165 |

Even though these results are the average of several measurements, some random scattering is apparent. Nevertheless it can be seen that adhesive force is reduced on cooling of the dies, both with the conventional procedure of Example 4 and the procedure of Example 5. However, the benefit of cooling is greater with the procedure of Example 5.

We claim:

1. In a process for stamping bars of a material selected from the group consisting of soap, non-soap detergent and mixtures thereof in which a billet of said material is located between a pair of opposing die members which are urged together to stamp the billet into a bar, the improvement wherein for at least part of the travel of the dies from initial contact with the billet to their point of closest approach, their relative velocity (V) decreases at a rate which is more than proportional to the change in the distance (h) between the dies so that the velocity $V_a$ at a distance $h_a$ and the velocity $V_b$ at a later distance $h_b$ are related by the inequality $$\frac{V_b}{V_a} < \frac{h_b}{h_a}.$$

2. A process according to claim 1 wherein the said velocities and distances satisfy an inequality $$\frac{V_b}{V_a} \leq \left(\frac{h_b}{h_a}\right)^m$$

where m is at least 1.5.

3. A process according to claim 1 wherein the stated inequality is satisfied for substantially all values of distance h up to the dies' closes approach after a distance ($h_0$) which is less than the distance at initial contact with the billet.

4. A process according to claim 1 wherein the relative speed of the dies at contact with the billet is in a range from $5\times10^3$ to $1\times10^6$ mm/min.

5. A process according to claim 1 wherein separation of the dies from said material takes place with a relative speed of the dies within a range from 0.1 to 1000 mm/min.

6. A process according to claim 5 wherein the said separation is preceded by a faster opening movement of the dies through a distance which is less than the elastic recovery of said material.

7. A process according to claim 5 wherein the said separation is followed by a faster opening movement of the dies.

8. A process according to claim 1 wherein the billet and the stamped bar comprise soap.

* * * * *